US012810042B2

(12) United States Patent
Kubli et al.

(10) Patent No.: US 12,810,042 B2
(45) Date of Patent: Nov. 24, 2026

(54) METHOD FOR SIMULATING AND ANALYSING AN ASSEMBLY OF PARTS CREATED BY A FORMING PROCESS

(71) Applicant: AutoForm Engineering GmbH, Pfäffikon SZ (CH)

(72) Inventors: Waldemar Kubli, Pfäffikon SZ (CH); Matthias Harnau, Pfäffikon SZ (CH); Mike Selig, Pfäffikon SZ (CH)

(73) Assignee: AutoForm Engineering GmbH, Pfäffikon (CH)

( * ) Notice: Subject to any disclaimer, the term of this patent is extended or adjusted under 35 U.S.C. 154(b) by 1050 days.

(21) Appl. No.: 17/304,766

(22) Filed: Jun. 25, 2021

(65) Prior Publication Data

US 2021/0406431 A1 Dec. 30, 2021

(30) Foreign Application Priority Data

Jun. 26, 2020 (CH) .................................... 00776/20

(51) Int. Cl.
*G06F 30/23* (2020.01)
*G01L 1/00* (2006.01)
(Continued)

(52) U.S. Cl.
CPC ................ *G06F 30/23* (2020.01); *G01L 1/00* (2013.01); *G06F 2111/10* (2020.01); *G06F 2113/24* (2020.01); *G06F 2119/18* (2020.01)

(58) Field of Classification Search
CPC .. G06F 30/23; G06F 2111/10; G06F 2113/24; G06F 2119/18; G06F 30/17; G06F 2119/14; G01L 1/00
See application file for complete search history.

(56) References Cited

U.S. PATENT DOCUMENTS 6,205,366 B1 * 3/2001 Tang ...................... B21D 22/20 700/15
6,353,768 B1 * 3/2002 Karafillis ................ G06F 30/23 700/145

(Continued)

FOREIGN PATENT DOCUMENTS

JP 2003157299 A * 5/2003 ............. G06F 30/00
JP 2005266892 A * 9/2005

OTHER PUBLICATIONS

Govik, A.et al. Finite element simulation of the manufacturing process chain of a sheet metal assembly. 2012. Journal of Materials Processing Technology, 212(7), 1453-1462. (Year: 2012).*

(Continued)

*Primary Examiner* — Aniss Chad
(74) *Attorney, Agent, or Firm* — Oppedahl Patent Law Firm LLC

(57) ABSTRACT

A computer-implemented method serves for simulating and analysing an assembly of two or more formed sheet metal parts. It comprises simulating a forming process of each part by an approximate simulation (20), and then performing an assembly simulation (40). In order to allow for a quick iteration over different part geometries to assess the assembly, the approximate simulation (20) comprises

- based on a reference geometry (10) of each part, estimating the deformation of a sheet metal blank required to attain the reference geometry (10);
- based on this deformation, estimating stresses within the material of the formed part;
- based on these stresses, estimating the shape of the formed part in which these stresses are in equilibrium, and using this shape as result (31) of the approximate simulation.

12 Claims, 2 Drawing Sheets

(51) Int. Cl.

| | |
|---|---|
| ***G06F 111/10*** | (2020.01) |
| ***G06F 113/24*** | (2020.01) |
| ***G06F 119/18*** | (2020.01) |

(56) References Cited

U.S. PATENT DOCUMENTS

| | | | | |
|---|---|---|---|---|
| 2003/0050765 | A1* | 3/2003 | Sasahara | G06F 30/00 702/155 |
| 2007/0251327 | A1* | 11/2007 | Broene | G01N 3/32 73/769 |
| 2019/0291163 | A1* | 9/2019 | Birkert | B21D 22/26 |

OTHER PUBLICATIONS

Gan, W. et al. Die design method for sheet springback. 2004. International Journal of Mechanical Sciences, 46(7), 1097-1113. (Year: 2004).*

Yang, X. A., & Ruan, F. A die design method for springback compensation based on displacement adjustment. 2011. International Journal of Mechanical Sciences, 53(5), 399-406. (Year: 2011) (Year: 2011).*

Li Zhang et al: "Advanced Simulation Technology Using LS-DYNA for Automotive Body Manufacturing Process: From Stamping To Assembly", Jan. 1, 2009, pp. 1-13.

Lee M G et al: "Analytical springback model for lightweight hexagonal close-packed sheet metal", International Journal of Plasticity, vol. 25, pp. 399-419, Apr. 20, 2008.

Patel et al: "Springback Analysis in Sheet Metal Forming Using Modified Ludwik Stress-Strain Relation", ISRN Mechanical Engineering, vol. 2013, pp. 1-11, Jan. 1, 2013.

Wikipedia article—Nyook And Others: "Bending", URL: https://en.wikipedia.org/w/index.php?title=Bending, captured Oct. 15, 2020.

* cited by examiner

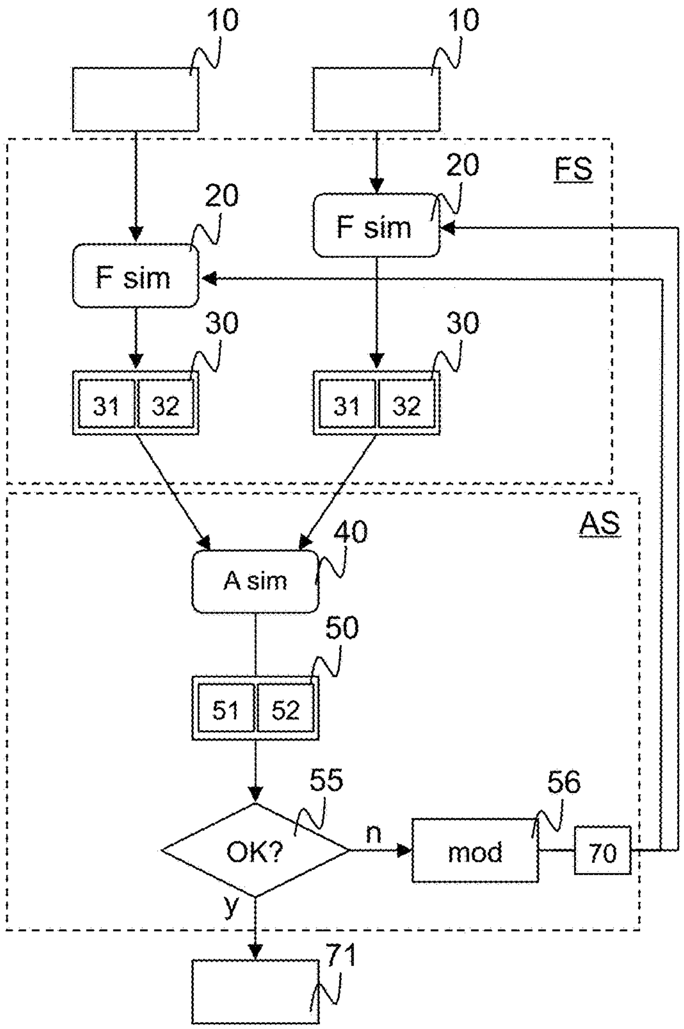
Fig. 4
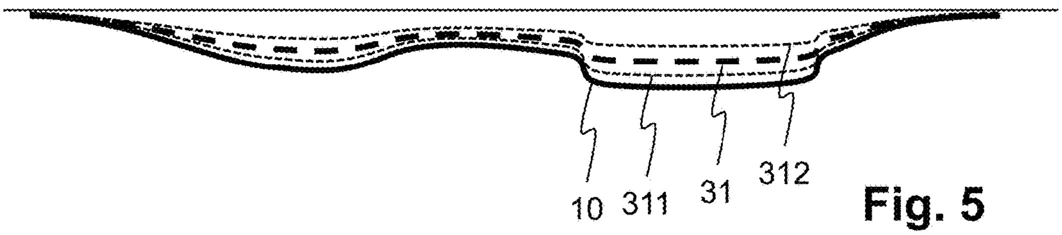
Fig. 5
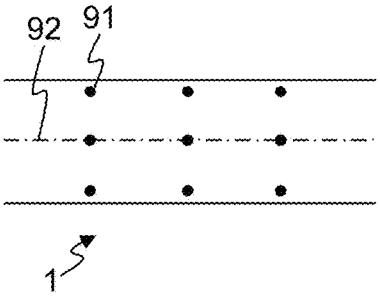
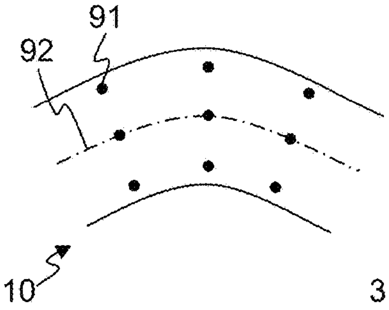
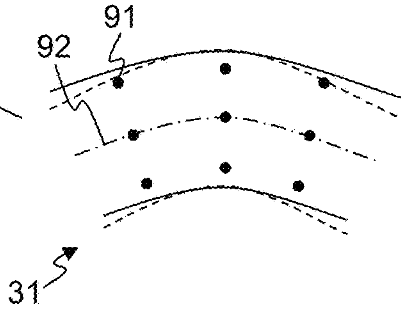
Fig. 6
Fig. 7
Fig. 8

METHOD FOR SIMULATING AND ANALYSING AN ASSEMBLY OF PARTS CREATED BY A FORMING PROCESS

The invention relates to the field of designing and manufacturing of parts, in particular of sheet metal parts, and tools for their manufacturing. It relates to a method for simulating and analysing an assembly of parts created by a forming process, in particular from sheet metal.

BACKGROUND

When designing parts and tools for sheet metal forming processes and subsequent assembly of several such formed parts, it is known to numerically simulate, using FEM (Finite Element Method) models, both the forming processes and the assembly processes. Such simulations take the geometry and material properties of the parts into account, compute internal states such as stresses and strains as parts are subjected to machining and assembly tools and forces, and compute the geometry and internal states of the parts after forming and assembly, respectively. Assessing the results after the simulation of the assembly process can show issues related to undesired deformation of parts, or of damage caused by excessive internal forces. Based on such an assessment, one may modify the design of the assembly, and thus also of the parts, in order to avoid the issues. Given the modified design, the simulation of the forming and assembly operations can be repeated. However, the repeated execution of such simulations can be computationally expensive.

It is therefore an object of the invention to create a method for simulating and analysing an assembly of parts created by a forming process, in particular from sheet metal of the type mentioned initially, which is computationally more efficient than known methods.

SUMMARY

This object is achieved by a method for simulating and analysing an assembly of parts created by a forming process, in particular from sheet metal according to the claims.

The computer-implemented method serves for simulating and analysing an assembly process of two or more parts, each of the two or more parts being created by a respective forming process, in particular from sheet metal, wherein the process comprises

- at least one forming process for generating at least one associated formed part, in particular from a sheet metal blank, and
- an assembly process for generating an assembled part from the at least one formed part and at least one second part, and the method comprises the steps of

- simulating the at least one forming process by a forming simulation, being an approximate simulation, having as input a reference model representing the reference geometry of the at least one formed part, and generating a free part simulated geometry;
- simulating the assembly process by an assembly simulation, having as input the free part simulated geometry of the at least one formed part and a free part geometry of the at least one second part, generating an assembled part simulation model.

Therein the approximate simulation is performed by

- determining an FEM mesh representing the reference geometry;

- for the material points of the FEM mesh, based on the reference geometry, determining associated strain values from a geometric transformation required to bring a flat sheet of material into the shape according to the reference geometry;
- for the material points of the FEM mesh, based on the associated strain values and on material properties of the blank, determining associated stress values;
- based on the FEM mesh with the associated stress values, determining displacements of mesh points that bring the mesh into an equilibrium state with regard to the stresses;
- the FEM mesh in this equilibrium state being the result of the approximate simulation, that is, the free part simulated geometry.

In this manner, the assembled part simulation model is determined and can be assessed without the need for computationally expensive multiple forming simulations. Instead, the use of the approximate simulation reduces the computational load and/or reduces development time.

In embodiments, in the step of determining associated strain values, this is done under the assumption that in a reference surface that is parallel to, or offset to the outer surfaces of the formed part, in particular a middle surface of the formed part, strain is zero or at a constant value.

This simplifies the computation of strain values in material points not located on the reference surface.

In embodiments, a scaling parameter is used to control an extent to which the free part simulated geometry deviates from the reference geometry.

This allows a user to modify the scaling parameter, in particular a single and scalar scaling parameter that affects simulation of the entire part. Thereby the user can in a simple manner globally change the behaviour of the material. In this way, variations in the result of the simulation can be evaluated quickly, in an approximate but simple manner.

In embodiments, the scaling parameter controls an extent to which, in the material points of the FEM mesh the associated strain is assigned to an elastic deformation of the material, and thereby influences the magnitude of the associated stress values.

It has turned out that this kind of scaling parameter adequately reflects variations in a forming process.

In embodiments, the reference model is defined by the reference geometry, a thickness of the blank, and material properties of the blank.

In embodiments, the reference geometry is defined by a geometric model, in particular a CAD model, that specifies the geometry of a two-dimensional surface or sheet in three dimensions. In combination with a value of the thickness of the surface or sheet, a three-dimensional object is specified. This gives a simple basis for the approximate simulation, allowing for quick iterations over differing CAD geometries.

In embodiments, the material properties of the blank comprise a stress-strain relationship, in particular a stress-strain curve or an approximation thereof.

It has turned out that even with such an approximation, the results of the approximate simulation are suitable for the purpose of simulating the assembly process.

In embodiments, the method comprises iteratively modifying the reference model and performing the forming simulation and assembly simulation until the assembled part simulation model satisfies an optimisation criterion.

In embodiments, the optimisation criterion is automatically checked, for example as a function of deviations of an assembled part simulated geometry of the assembled part simulation model from the reference geometry, and/or of an assembled part simulated internal state of the assembled part simulation model.

In embodiments, it can be an assessment by a human user. The human user can, for example, evaluate a visual representation of these deviations and/or this internal state, and based on this decide whether modification of the reference model is required, or whether the method can terminate. Modification of the compensated reference model can be performed, for example, by the user being guided by the visual representation.

In embodiments, the method comprises automatically varying one or more shape parameters, in particular exactly one shape parameter, of one part of an assembly, and for each such variation performing the forming simulation and the assembly simulation, thereby creating a plurality of corresponding assembled part simulation models;

determining a degree of variation of the assembled part simulated geometry over the plurality of assembled part simulation models, and visually displaying this degree variation to a user, in particular overlaid over a visual representation of the part.

In embodiments, the second part is generated by a forming process, and a corresponding free part simulated geometry of the second part is generated by a forming simulation being an approximate simulation.

A method for designing a tool for manufacturing a part comprises performing the steps for simulating and analysing an assembly process of two or more parts, each of the two or more parts being created by a respective forming process, thereby determining the optimised adapted reference geometry, and manufacturing the tool with a shape defined by the optimised adapted reference geometry.

A method for designing a part to be manufactured using a tool comprises performing the steps for simulating and analysing an assembly process of two or more parts, each of the two or more parts being created by a respective forming process, thereby determining the optimised adapted reference geometry, and manufacturing the part with a shape defined by the optimised adapted reference geometry and optionally manufacturing an assembly comprising the part.

In embodiments the parts are created by a forming process being a sheet metal forming process. In an assembly process, an assembled part is assembled from two or more sub-parts or component parts. Assembling the component parts can cause them to be deformed, deviating from a desired nominal geometry or reference geometry.

The geometry of a part describes the geometrical shape of the part. The reference geometry typically is created as a CAD model. With this geometry as a target, a tool for the forming process is designed, and the forming process using this tool is simulated. Typically, this is done by means of a finite element method (FEM). An FEM model resulting from the simulation of the forming process represents the state of the part, which can comprise at least the part's geometry and the internal state of the material of the part, in particular internal stresses. The state can be considered to be a result of the simulation.

A tool for a forming process can comprise, for example, a punch and/or a die in a deep drawing press station or in a progressive die or line or transfer press, driven by mechanical, hydraulic or servo actuation.

A computer program for the method for simulating and analysing an assembly of parts created by a forming process, in particular from sheet metal according to the invention is loadable into an internal memory of a digital computer, and comprises computer program code to make, when said computer program code means is loaded in the computer, the computer execute the method according to the invention. In a preferred embodiment of the invention, the computer program product comprises a computer readable medium, having the computer program code means recorded thereon. A corresponding data processing system is programmed to execute the method, in particular by being programmed with the computer program codes. A method of manufacturing a non-transitory computer readable medium, comprises the step of storing, on the computer readable medium, computer-executable instructions which when executed by a processor of a computing system, cause the computing system to perform the method for simulating and analysing an assembly of parts created by a forming process.

Further preferred embodiments are evident from the dependent patent claims.

DESCRIPTION OF THE DRAWING

The subject matter of the invention will be explained in more detail in the following text with reference to preferred exemplary embodiments which are illustrated in the attached drawing, which schematically shows:

FIG. 4 a corresponding iterative method;

FIG. 5 a reference geometry and a free part simulated geometry derived from it; and FIGS. 6-8 material points in a simulation of a deformed section of a part.

In principle, identical or functionally identical elements are provided with the same reference symbols in the figures.

DETAILED DESCRIPTION

Figure 1:
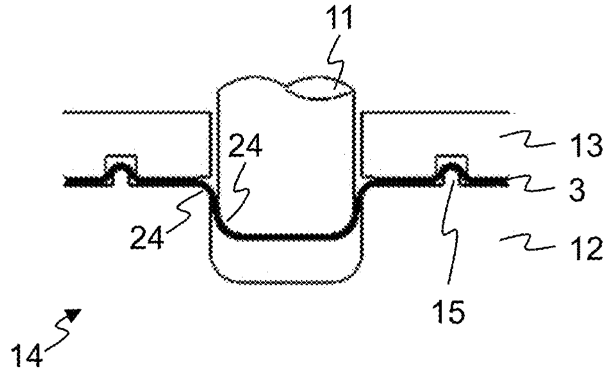
FIG. 1 a tool for forming a part by deep drawing.

FIG. 1 shows a tool 14 for forming a part 3, the tool 14 comprising a punch 11, a die 12 and a blank holder 13. The part 3 is held against the die 12 by means of the blank holder 13. The tool 14 is arranged in a forming press, not shown. During the forming operation, the part 3 is held between the die 12 and the blank holder 13, the punch 11 is moved towards the die 12, or vice versa, and the part 3 is formed according the shape of the tool 14. This involves pulling and stretching the part 3 over radii 24 of the tool 14. In order to control the flow of the part material, drawbeads 15 can be arranged at the periphery of the tool 14, holding back the flow of material. The tool shown corresponds to a deep drawing forming operation, but the method described herein is applicable to other forming methods too. The shape of the part 3 is not uniquely determined by the shape of the tool 14, but is also determined by effects such as springback, thickening and thinning of the material by the forming process, etc. A forming operation can comprise a single forming step or a sequence of forming steps.

Figure 2:
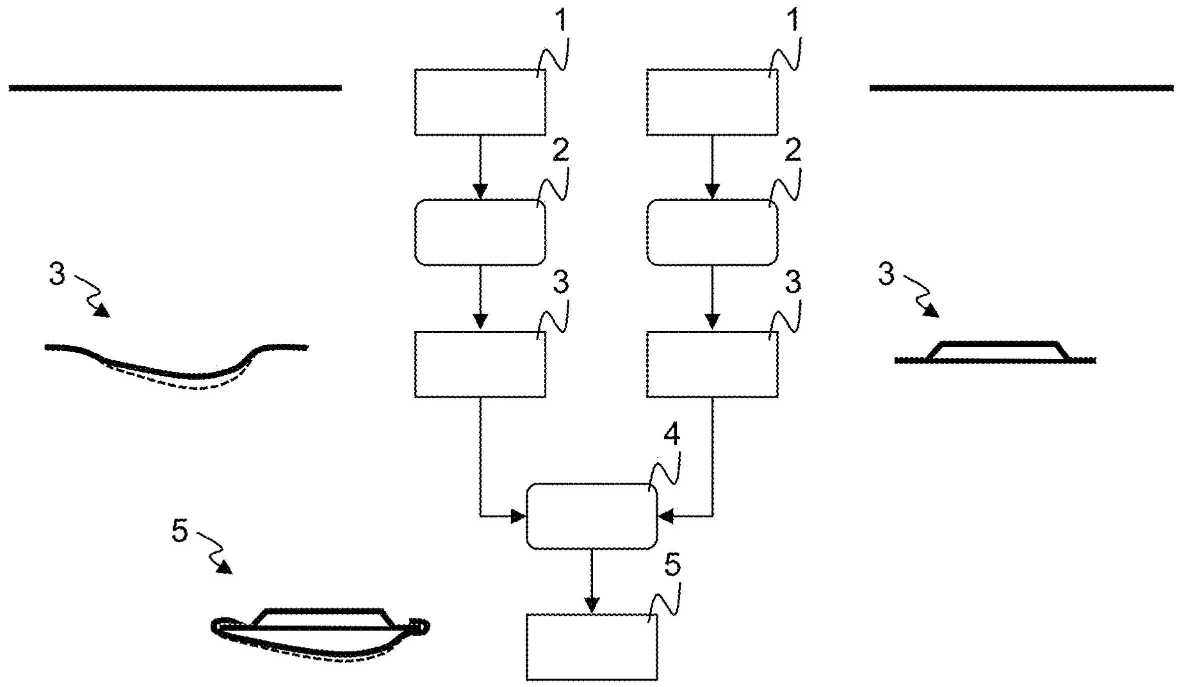
FIG. 2 a manufacturing process for forming parts and creating an assembly of parts.

FIG. 2 schematically shows a manufacturing process for creating an assembly of parts, or assembled part 5, from two or more parts 3. In different forming processes 2, formed parts 3 are generated from blanks 1. The left side of FIG. 2 very schematically shows a formed part 3 without springback, with a dotted line, its shape corresponding to a geometry of the tool, and with springback, with a full line.

The right side of FIG. 2 very schematically shows a formed part 3 in the shape of a reinforcement part.

The formed parts 3 are assembled in an assembly process 4, creating the assembled part 5. From the point of view of the assembled part 5, the formed parts 3 are considered to be components. The assembly process 4 typically involves joining or assembling the two parts by some kind of joining technology. Joining technologies can comprise, for example, welding, soldering, gluing, nuts and bolts, rivets, etc. The assembly process 4 can in particular also comprise hemming and/or seaming, that is, joining the components by folding one part over the other one or joining two components by folding them together. FIG. 2 very schematically shows the part from the left side assembled with the reinforcement part from the right side. The assembly process 4 can involve welding and/or seaming or hemming. This usually causes deformation of the parts involved.

Since the individual formed parts 3 do not correspond to their nominal or ideal geometry, they will not fit together perfectly when being assembled, and thus may be deformed in the course of the assembly process, or it may not be at all possible to assemble the formed parts 3. In the assembled part 5, stiffer parts can force a change of shape in other, less stiff parts. FIG. 2 very schematically shows the assembled part 5, in which one of the parts has been deformed from its shape as formed part 3, represented by a dotted line, to its shape after assembly, represented by a full line.

Depending on the nature of the part, the deformation as such can be undesired, affecting the appearance of the part, or internal states in the part can affect the integrity of the part, or undesired thinning or thickening effects are caused by the assembly.

Deviations of the individual formed parts 3 from their nominal or ideal geometry can be due to the abovementioned effects such as springback on the one hand. Such effects can be predictable and have repeatable effects on the geometry. On the other hand, certain deviations can be due to variations in the manufacturing process, since every process can only achieve limited accuracy, that is, repeated application of a process will give varying results. The best one can do is to keep these variations within specified tolerances. Given the fact that variations within tolerances are unavoidable, an issue is to design the parts and the assembly such that final geometry is robust with regard to the variations.

The goal of the method for simulating and analysing an assembly of parts created by a forming process, in particular from sheet metal is to determine the relative influence that each of the parts, and/or variations of the geometry of the part, have on the resulting shape of the assembly, and on deviations of this shape from the target shape or reference geometry 10, and/or on internal states of the assembly or assembled part 5.

The reference geometry 10 of the assembly shall be understood to refer to the assembly of the reference geometries 10 of the parts constituting the assembly.

For example, it can be the case that the shape of one part in the assembled part 5 is sensitive to variations in the shape of another part. This depends on the geometry of the formed parts 3 that are assembled to form the assembled part 5, and on the relation of the parts within the assembled part 5. It is possible to determine the geometry of the formed parts 3, and optionally also variations of this geometry, by FEM simulations of the forming process 2. It further is possible, based on the geometry of the formed parts 3, to simulate the part assembly process 4 and to determine the geometry of the assembled part 5 by means of an FEM simulation of the part assembly process 4. However, the repeated execution of such FEM simulations is computationally expensive.

Figure 3:
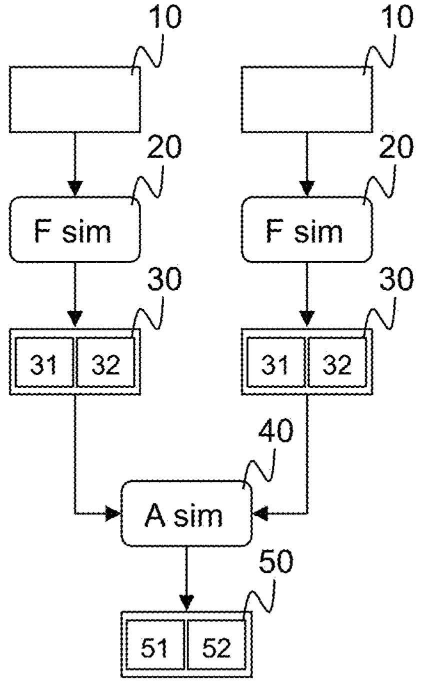
FIG. 3 a simplified structure of a corresponding simulation and design process.

FIG. 3 schematically shows a simplified structure of a corresponding simulation and design process used to model the real process of FIG. 2 and to design the parts and thereby also the tools used. Based on a target geometry of the assembled part 5, reference geometries 10 of the parts making up the assembled part 5 are created. For each formed part 3, the reference geometry 10 is used to design a forming process for creating this part, in particular the geometry of the tool. Simulating this forming process in a forming simulation 20 results in a simulation model of the part. In order to differentiate this simulation model of the not yet assembled part, it shall be referred to as free part simulation model 30.

The forming simulation 20 according to the prior art is done by means of a finite element method (FEM). The simulation determines the change in geometry from a sheet metal blank to the geometry of the formed part, and corresponding changes in the state of the material of the part. The simulation can be based on the shape (or geometry) of the elements of the tool and operating parameters of the tool. In an FEM model, the part is modelled by a finite number of material points arranged in a grid or mesh, and the behaviour of the part is determined for each of these material points, also called simulation points. The simulation can involve forward simulation, single step simulation and the like. Results of such a simulation can include an internal state of the material during and after the forming operation, and the geometry of the part, that is, the shape of the part. The internal state can comprise stresses of the material in each simulation point, and other state variables such as strain, temperature, thinning and thickening effects. The state can be considered to be a result of the simulation. The free part simulation model 30 thus comprises a free part simulated geometry 31 and, in some cases, a free part simulated internal state 32.

According an aspect of the present invention, the forming simulation 20 is performed as an approximate simulation. In particular, the approximate simulation is based on the shape of the formed part 3 as defined by its reference geometry 10 done according to the following procedure:

- based on a reference model representing the reference geometry 10, an estimate is made of displacements or strains that need to take place for bringing a flat sheet of material into the shape according to the reference geometry 10. The reference model can comprise an FEM mesh of the reference geometry 10. If the reference geometry 10 is defined by a CAD model, the FEM mesh is generated from the CAD model
- in embodiments, the reference model is characterised by a thickness and material properties of the sheet material.
- based on these strains, and material properties of the part, in particular stress-strain properties of the material, stresses within the material are estimated.
- based on the estimated stresses within the material, an estimate is made of displacements within the material.
- based on the displacements within the material, the deformation of the part is determined, and thereby the free part simulated geometry 31 is determined.

This procedure is explained in more detail with reference to FIGS. 6 to 8: the figures schematically show a cross section of a part, with material points 91, in different stages of the approximate simulation of the deformation of the part.

FIG. 6 shows the not yet shaped part, thus the blank 1 of sheet material in an initial state. Points 91 of material are represented by dots, a dash-dot line represents a sectional view of a middle plane, or, in more general terms, of a reference surface 92 of the blank 1.

FIG. 7 shows a section of the part in the shape of the reference geometry 10, being bent, forming a bend. This shape is the starting point for the approximate simulation. Based on the shape, it is determined in what manner the material must be deformed to achieve this shape. The following explanations are in terms of a simple bend in two dimensions but are easily generalised to more complex shapes in three dimensions.

In the bent part, the reference surface 92 is a surface that is parallel to (or offset to) the outer surfaces of the reference geometry 10. In embodiments, it lies in the middle between the two outer surfaces. In other embodiments, it lies closer to one or the other of the two outer surfaces.

In embodiments, it is assumed that in material points 91 on the reference surface 92 in the reference geometry 10 the strain is zero, that is, the material is neither stretched nor compressed. In embodiments, it is assumed that the material on the reference surface 92 is subject to a certain strain, in particular a constant strain.

From the geometry of the part it follows that the material points 91 on the outside of the bend are further apart from one another than in the initial state, corresponding to a stretching of the material or positive strain, and on the inside they are closer to one another, corresponding to a compression of the material or negative strain. The amount of strain in each point is determined solely by the geometry of the part as defined by the reference geometry 10. This is evident for a simple radius represented in FIG. 7 and is also the case for any 3D shape of the formed sheet of material. The amount of positive or negative strain in a particular material point depends on the curvature or the radius of the bend affecting this material point, and its distance from the reference surface 92. If the material on the reference surface 92 is assumed to be subject to a certain nonzero strain, then this also affects the strain in the particular material point.

Given the properties of the material, in each material point the stress corresponding to the strain is determined, in particular by the stress-strain relation for this material. The stress-strain relation can be represented by a stress-strain curve. It can be approximated by a linear relation for the elastic range of deformation, with the stress being equal to the strain multiplied by Young's modulus. In a general case the stress and strain are represented by corresponding tensors.

Depending on the magnitude of the strain, plastic deformation occurs. Typically, for small strain values, only elastic deformation occurs. After exceeding a certain limit, higher strain causes plastic deformation. This limit can be described, for example, by a yield surface.

As a result of these material properties, in each material point 91 considered, a portion of the strain can be assigned to elastic deformation, and the remaining portion to plastic deformation. For different magnitudes of the strain, the portions differ.

Based on the above, the stress in each material point 91 considered can be determined as the stress corresponding to the strain value for elastic deformation in this material point 91, the elastic deformation being a portion of the total strain.

This defines a stress distribution within the material that is not in equilibrium. In order to come to an equilibrium, the part needs to be deformed, which happens by displacement of the material points 91 in accordance with their associated stresses.

The exact deformation can be determined by generating an FEM mesh (not illustrated in the figures) based on the reference geometry 10. The FEM mesh comprises mesh points or nodes, and elements. Then, for each material point within a finite element, an associated stress state is determined, as explained above for material points 91 in general. The resulting FEM model, representing the reference geometry 10 but with the associated stress state in each material point, corresponds to a non-equilibrium state of the mesh.

Given the geometry of FIG. 7, with the mesh in this non-equilibrium state, a deformation of the part due to these stress values is determined. This involves displacement of the mesh points such that the stress values over the part are in equilibrium. This can be done, for example, by a commonly known non-linear iterative solving process. This results in the mesh in an equilibrium state, with a different geometry than in the non-equilibrium state. The equilibrium state is illustrated in FIG. 8, with the part outlines from FIG. 7 shown for comparison in dashed lines.

The geometry of the part according to the equilibrium state is the result of the approximate simulation, and is used as the free part simulated geometry 31 of the free part simulation model 30. The stresses within the material represent a free part simulated internal state 32, but since it is only a rough approximation, it normally is not used in the subsequent assembly simulation 40.

In embodiments, the forming simulation 20 is controlled by a scaling parameter.

The scaling parameter controls the portion of the strain that is assigned to the elastic deformation. Increasing, for example, the scaling parameter, increases, in each material point, the stress corresponding to the strain, and consequently increases the stresses within the mesh in the non-equilibrium state, and consequently increases the displacement and overall deformation of the part. The inverse holds when reducing the portion of the strain assigned to elastic deformation. Changing the scaling parameter allows to vary the degree of deformation taking place in the approximate simulation with a single parameter. This has turned out to be a useful feature in varying and assessing the overall behaviour of the part geometry in a simple manner.

Other variations of the scaling parameter can be implemented, which influence the degree in which the approximate simulation deviates from the reference geometry 10. This can happen in a mathematically equivalent manner, or with at least approximately similar results.

FIG. 5 schematically shows a cross section of a formed part 3, with the reference geometry 10 and the free part simulated geometry 31. As a result of the approximate simulation, the free part simulated geometry 31 represents one possible approximation. The effect of varying the scaling parameter is shown by differently scaled geometries 311 and 312.

The reference model representing the reference geometry 10 typically is a CAD model, or a mesh-based model that is derived from a CAD model.

The CAD model of a part is as a rule built from geometric primitives, that is, 3D surface or volume elements. Geometric primitives can include, on a lower level, points, lines and line segments, circles and ellipses, triangles, polygons, spline curves etc. On a higher level, geometric primitives can include spheres, cubes or boxes, toroids, cylinders, pyramids etc. The primitives can be defined by analytic functions.

When generating a mesh-based representation of the part on the basis of primitives of the CAD model, the mesh can be aligned with the shape of the primitives. For example, mesh points will be placed on boundary lines between geometric primitives, and mesh edges will follow such boundary lines. Depending on a local shape of the CAD model, e.g. with regard to curvature of surfaces, the spatial resolution of the mesh is adapted to the shape by decreasing the distance between mesh points. Conversely, for flat areas, the resolution is reduced. Mesh discretisation can be controlled by specifying a maximum 3D chordal error between the analytic primitives and the mesh approximation.

Given the free part simulation models 30, an assembly simulation 40 simulates the assembly of the formed parts 3. The assembly simulation 40 can thus involve the simulation of the assembly, hemming and/or seaming of parts. Typically, an FEM simulation is used. The result of the assembly simulation 40 is a further simulation model, which shall be referred to as assembled part simulation model 50. The assembled part simulation model 50 comprises an assembled part simulated geometry 51 and can also comprise an assembled part simulated internal state 52.

In the simulation, as in reality, the shape of the formed parts 3, represented by the free part simulation model 30, does not correspond to their nominal or ideal geometry, as explained earlier. The approximate simulation gives rise to deviations in geometry, with optionally the scaling parameter controlling an extent of the deviations. As a result, the assembly simulation 40 reflects the deformation of the parts by the part assembly process 4, and can also show undesired values in the assembled part simulated internal state 52.

In summary, the procedure represented by FIG. 3 allows for a computationally efficient simulation of the effects of the part design of individual parts on the assembled part 5.

FIG. 4 shows an iterative process based on the above. Steps related to the forming simulation 20 are enclosed in a box labels FS. Steps related to the assembly simulation 40 are enclosed in a box labels AS. In addition to the steps already described, the assembled part simulation model 50 is reviewed in an assessment step 55. This step can involve an assessment by a human user. If the assembled part simulation model 50 represents a satisfactory shape and/or internal state of the modelled assembled part 5, the procedure ends, with an optimised adapted reference geometry 71 being output. An adapted reference geometry 70 represents a modified version of the reference geometry 10 of one or more of the parts making up the assembled part 5. If according to the assessment step 55 the assembled part simulation model 50 does not represent a satisfactory result, in a step of adaption of free part geometry 56 an adapted reference geometry 70 for one or more parts is created, and is input to the forming simulation 20 of the respective part. The process of forming simulation 20, assembly simulation 40 and assessment 55 can be iteratively repeated until the result is satisfactory, corresponding to the optimised adapted reference geometry 71.

In embodiments, this iterative repetition of the process is part of an automated optimisation process, in which the adapted reference geometry 70 is automatically varied until the result is satisfactory.

In embodiments, one or more shape parameters of one or more formed parts 3 are systematically varied, and for each such variation the forming simulation 20, assembly simulation 40 is performed. Information from the assembled part simulation models 50 from these variations is combined to show the variation of evaluation variables. This can express a sensitivity of the assembled part simulation models 50, or the assembled part 5, respectively, with regard to the one or more shape parameters.

In particular, the information being combined is be the assembled part simulated geometries 51, and a variation of the geometry of the assembled part 5 is determined, and, for example, displayed to a user by a visual representation. Therein, the variation in each point of an assembled part 5 or the assembly is overlaid over a visual representation of the assembled part 5, for example, by colouring its visual representation.

While the invention has been described in present preferred embodiments of the invention, it is distinctly understood that the invention is not limited thereto, but may be otherwise variously embodied and practised within the scope of the claims.

The invention claimed is:

1. A computer-implemented method for designing and manufacturing a tool for manufacturing a part, comprising simulating for at least one first formed part and at least one second formed part a respective forming process by a forming simulation, being an approximate simulation, having as input a reference model representing a reference geometry of the respective formed part, and the forming simulation generating a free part simulated geometry of the respective formed part;

simulating an assembly process by an assembly simulation, having as input the free part simulated geometry of the at least one first formed part and a free part geometry of the at least one second part, the assembly simulation generating an assembled part simulation model, corresponding to an optimised adapted reference geometry; and manufacturing the tool with a shape defined by the optimised adapted reference geometry;

wherein the forming process comprises generating at least one formed part from a sheet metal blank, and wherein the approximate simulation generating a free part simulation geometry comprises determining an FEM mesh representing the reference geometry;

for material points of the FEM mesh, based on the reference geometry, determining associated strain values from a geometric transformation required to bring a flat sheet of material into the shape according to the reference geometry;

for the material points of the FEM mesh, based on the associated strain values and on material properties of the blank, determining associated stress values;

based on the FEM mesh with the associated stress values, determining displacements of mesh points that bring the mesh into an equilibrium state with regard to the stresses;

the FEM mesh in this equilibrium state being a result of the approximate simulation, that is, the free part simulated geometry;

the approximate simulation comprising controlling the forming simulation by a scaling parameter to control an extent to which the free part simulated geometry deviates from the reference geometry, thereby varying a degree of deformation taking place in the approximate simulation and varying an overall deformation of the part geometry with the scaling parameter.

2. The method of claim 1 wherein, in the step of determining associated strain values, this is done under the assumption that in a reference surface that is parallel to, or offset to the outer surfaces of the formed part, in particular a middle surface of the formed part, strain is zero or at a constant value.

3. The method of claim 1, wherein the scaling parameter, in the step of determining associated stress values, controls an extent to which, in the material points of the FEM mesh, a portion of the associated strain is assigned to an elastic deformation of the material, with a remaining portion being assigned to plastic deformation, and thereby influences the magnitude of the associated stress values.

4. The method of claim 1, wherein the reference model is defined by the reference geometry, a thickness of the blank, and the material properties of the blank.

5. The method of claim 4, wherein the material properties of the blank comprise a stress-strain relationship, in particular a stress-strain curve or an approximation thereof.

6. The method of claim 1, comprising iteratively modifying the reference model and performing the forming simulation and assembly simulation until the assembled part simulation model satisfies an optimisation criterion, thereby corresponding to the optimised adapted reference geometry.

7. The method of claim 1, comprising automatically varying one or more shape parameters, in particular exactly one shape parameter, of one part of an assembly, and for each such variation performing the forming simulation and the assembly simulation, thereby creating a plurality of corresponding assembled part simulation models;

determining a degree of variation of an assembled part simulated geometry over the plurality of assembled part simulation models, and visually displaying this degree variation to a user, in particular overlaid over a visual representation of the part.

8. The method of claim 1, wherein the second part is generated by the forming process, and a corresponding free part simulated geometry of the second part is generated by the forming simulation being the approximate simulation.

9. The method of claim 1, comprising manufacturing the part with a shape defined by the optimised adapted reference geometry and manufacturing an assembly comprising the part.

10. A data processing system for use in the method of claim 1, the data processing system comprising a processor and a non-transitory memory storing instructions that, when executed by the processor, cause the system to be programmed to simulating for at least one first formed part and at least one second formed part a respective forming process by a forming simulation, being an approximate simulation, having as input a reference model representing a reference geometry of the respective formed part, and the forming simulation generating a free part simulated geometry of the respective formed part;

simulating an assembly process by an assembly simulation, having as input the free part simulated geometry of the at least one first formed part and a free part geometry of the at least one second part, the assembly simulation generating an assembled part simulation model, corresponding to an optimised adapted reference geometry;

wherein the approximate simulation generating a free part simulation geometry comprises determining an FEM mesh representing the reference geometry;

for material points of the FEM mesh, based on the reference geometry, determining associated strain values from a geometric transformation required to bring a flat sheet of material into the shape according to the reference geometry;

for the material points of the FEM mesh, based on the associated strain values and on material properties of the blank, determining associated stress values;

based on the FEM mesh with the associated stress values, determining displacements of mesh points that bring the mesh into an equilibrium state with regard to the stresses;

the FEM mesh in this equilibrium state being a result of the approximate simulation, that is, the free part simulated geometry;

the approximate simulation comprising controlling the forming simulation by a scaling parameter to control an extent to which the free part simulated geometry deviates from the reference geometry, thereby varying a degree of deformation taking place in the approximate simulation and varying an overall deformation of the part geometry with the scaling parameter.

11. A non-transitory computer readable medium having stored a computer program loadable into an internal memory of a digital computer, the computer program for use in the method of claim 1, the computer program comprising computer program code to make, when said program code is loaded in the computer, the computer execute a procedure simulating for at least one first formed part and at least one second formed part a respective forming process by a forming simulation, being an approximate simulation, having as input a reference model representing a reference geometry of the respective part, and the forming simulation generating a free part simulated geometry of the respective formed part;

simulating an assembly process by an assembly simulation, having as input the free part simulated geometry of the at least first one formed part and a free part geometry of the at least one second part, the assembly simulation generating an assembled part simulation model, corresponding to an optimised adapted reference geometry;

wherein the approximate simulation generating a free part simulation geometry comprises determining an FEM mesh representing the reference geometry;

for material points of the FEM mesh, based on the reference geometry, determining associated strain values from a geometric transformation required to bring a flat sheet of material into the shape according to the reference geometry;

for the material points of the FEM mesh, based on the associated strain values and on material properties of the blank, determining associated stress values;

based on the FEM mesh with the associated stress values, determining displacements of mesh points that bring the mesh into an equilibrium state with regard to the stresses;

the FEM mesh in this equilibrium state being a result of the approximate simulation, that is, the free part simulated geometry;

the approximate simulation comprising controlling the forming simulation by a scaling parameter to control an extent to which the free part simulated geometry deviates from the reference geometry, thereby varying a degree of deformation taking place in the approximate simulation and varying an overall deformation of the part geometry with the scaling parameter.

12. A method of manufacturing a non-transitory computer readable medium, comprising the step of storing, on the computer readable medium, computer-executable instructions which when executed by a processor of a computing system, cause the computing system to perform the computer-implemented procedure recited in claim 11.

* * * * *